US010494893B2

United States Patent
Tse et al.

(10) Patent No.: US 10,494,893 B2
(45) Date of Patent: Dec. 3, 2019

(54) SOLID-CORE FILAMENT-WOUND COMPOSITE MANDREL

(71) Applicant: Schlumberger Technology Corporation, Sugar Land, TX (US)

(72) Inventors: Kyle Tse, Houston, TX (US); Colby Jarrett, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 227 days.

(21) Appl. No.: 15/475,970

(22) Filed: Mar. 31, 2017

(65) Prior Publication Data

US 2017/0284166 A1 Oct. 5, 2017

Related U.S. Application Data

(60) Provisional application No. 62/316,566, filed on Apr. 1, 2016.

(51) Int. Cl.
*E21B 33/12* (2006.01)
*E21B 33/134* (2006.01)
*B29C 70/32* (2006.01)

(52) U.S. Cl.
CPC .......... *E21B 33/1208* (2013.01); *B29C 70/32* (2013.01); *E21B 33/134* (2013.01)

(58) Field of Classification Search
CPC .... E21B 33/1208; E21B 33/134; B29C 70/32
See application file for complete search history.

(56) References Cited

U.S. PATENT DOCUMENTS 5,795,524 A * 8/1998 Basso, Jr. ............... B29C 33/52
156/155
2015/0285026 A1* 10/2015 Frazier ............... E21B 33/1291
166/120

* cited by examiner

*Primary Examiner* — Brad Harcourt

(57) ABSTRACT

A technique for manufacturing a millable bridge plug for plugging of a wellbore during, for example, a fracturing operation. A bridge plug is constructed with an obstructed internal passage. The obstructed internal passage is formed by winding a composite material about a wrapping mandrel having at least one cylindrical part and a solid part coupled thereto. The cylindrical part is removed after a curing process leaving a mandrel with a plugged internal passageway upon which a seal member combined with a plurality of slips for engaging a surrounding wall, e.g. a surrounding wellbore wall, may be coupled.

15 Claims, 2 Drawing Sheets

SOLID-CORE FILAMENT-WOUND COMPOSITE MANDREL

CROSS-REFERENCE

This application claims the benefit of U.S. Provisional Application No. 62/316,566, filed on Apr. 1, 2016, the disclosure of which is hereby incorporated by reference in its entirety.

TECHNICAL FIELD

The present disclosure relates to plug systems having nonmetallic components to facilitate milling.

BACKGROUND

Many millable frac and bridge plugs utilize nonmetallic components to facilitate ease of milling during plug removal. Of the nonmetallic materials used, commonly filament and convolute-wound composites are used. These wound materials have high hoop strengths, making them well suited for cylindrical, load-bearing components such as cones and mandrels.

In conventional systems, filament and convolute-wound composites are made by winding around a solid wrapping mandrel. The filament or sheet is coated with resin prior to application onto the wrapping mandrel and successively layered until the desired dimensions are achieved. Once the part is complete, it is cured and the wrapping mandrel is removed. The resulting part is extremely strong, relatively cheap, and quick to manufacture.

Due to the manufacturing process required to make these wound components, parts with solid inner diameters cannot be made. This is generally not an issue for frac plugs where flow area through the inner diameter ("ID") is desired. However, most bridge plugs have functional requirements that necessitate a solid ID. As a result, corks or other mechanical components are installed in wound mandrels for bridge plugs to obstruct their IDs and allow them to act as "solid" components. Unfortunately, these corks may be problematic both in manufacturing, installation, and operation.

Therefore, there is a need for an improved wound composite mandrel to improve manufacturing and installation, and to facilitate milling operations.

SUMMARY

A bridge plug and a method for manufacturing the bridge plug are provided. The bridge plug may take the form of a millable bridge plug. The millable bridge plug may be constructed with an obstructed inner passage. The inner passage is obstructed by a member integrally positioned within the inner passage and about which composite material is wound. The obstruction is positioned within a mandrel of the bridge plug during manufacture of the mandrel.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

Certain embodiments of the disclosure will hereafter be described with reference to the accompanying drawings, wherein like reference numerals denote like elements. It should be understood; however, that the accompanying figures illustrate the various implementations described herein and are not meant to limit the scope of various technologies described herein.

DESCRIPTION OF THE INVENTION

The present disclosure generally relates to a system and methodology which facilitates construction of a millable bridge plug with an obstructed internal passageway. The bridge plug may be used for plugging of a wellbore during, for example, a fracturing operation. Aspects may generally include a true solid inner diameter ("ID") design for bridge plugs constructed of, for example, filament and convolute-wound composite mandrels. As such, aspects may take the form of a manufacturing method which includes wrapping of a solid ID cylindrical components during a winding process. Aspects may simplify manufacture of the wound mandrel for a composite bridge plug.

Figure 1A:
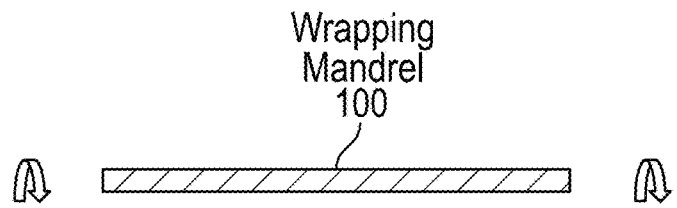
FIG. 1A illustrates a solid mandrel about which composite material is wound, according to an aspect of this disclosure.
Figure 1B:
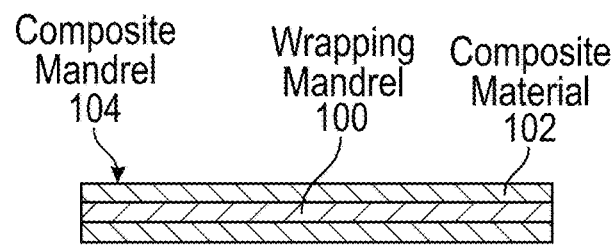
FIG. 1B is a cross-sectional view of the mandrel of FIG. 1A, with layers of composite material wrapped about it, according to an aspect of this disclosure.
Figure 1C:
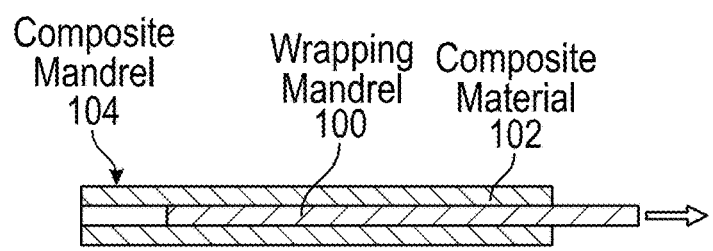
FIG. 1C illustrates withdrawal of the solid mandrel from the layers of the composite material of FIG. 1B, according to an aspect of this disclosure.
Figure 1D:
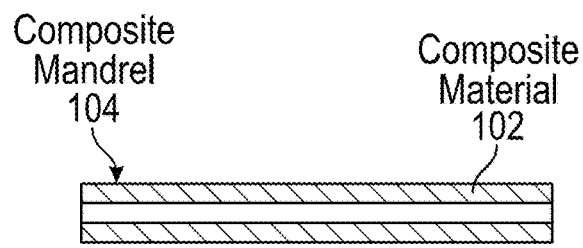
FIG. 1D is a cross-sectional view of a composite tubular after withdrawal of the mandrel of FIG. 1A, according to an aspect of this disclosure.

FIGS. 1A through 1D illustrate a wrapping mandrel 100 comprising a single component. During a winding process, the wrapping mandrel 100 is wound with a composite material 102. After the winding process is complete, the wrapping mandrel 100 is removed from the composite material 102 forming a cylindrical composite mandrel 104. The composite mandrel 104 has a channel that extends therethrough formed by the wrapping mandrel 100.

Figure 2A:
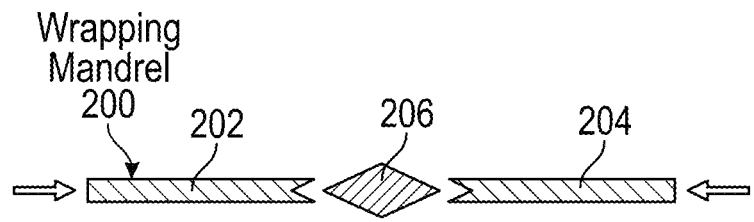
FIG. 2A illustrates independent segments of a multi-segment wrapping mandrel, according to an aspect of this disclosure.
Figure 2B:
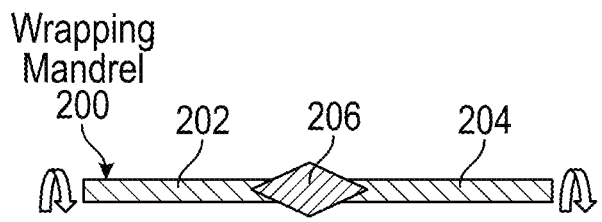
FIG. 2B illustrates the independent segments of the multi-segment wrapping mandrel of FIG. 2A coupled together, according to an aspect of this disclosure.
Figure 2C:
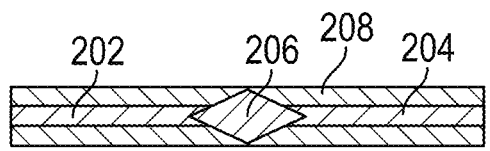
FIG. 2C is a cross-sectional view of the multi-segment wrapping mandrel of FIG. 2B with composite material applied about the mandrel, according to an aspect of this disclosure.
Figure 2D:
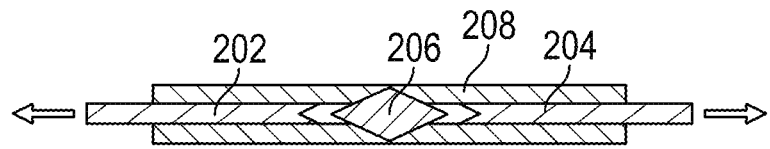
FIG. 2D illustrates removal of segments of the multi-segment wrapping mandrel of FIG. 2C, according to an aspect of this disclosure.
Figure 2E:
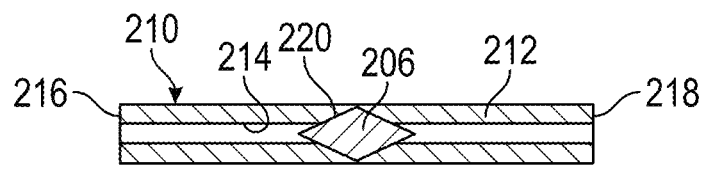
FIG. 2E illustrates a composite tubular with a solid inner passageway after removal of independent segments, according to an aspect of this disclosure.

FIGS. 2A through 2E illustrate a wrapping mandrel 200 having multiple parts, including two wrapping mandrels 202 and 204 extending from a core or plug 206. The core 206 may form a substantially solid piece and comprise a non-metallic material. In an alternative aspect, the core 206 may comprise a metallic material. The nonmetallic core 206 may be configured to allow the wrapping mandrel 200 to form as one solid piece. Before the winding process, the two wrapping mandrels 202 and 204 are brought together around the solid core 206. The two wrapping mandrels 202 and 204 sandwich the solid core 206 between them such that the solid core 206 is "squeezed" by the two wrapping mandrels 202 and 204. The two wrapping mandrels 202 and 204 may squeeze the solid core 206 from opposing directions. During a winding process, the wrapping mandrel 200 is wound with a composite material 208. After winding is complete, the two parts 202 and 204 of the wrapping mandrel 200 may be separated and removed, leaving a mandrel 210 with the solid core 206 inlaid. The mandrel 210 may have the structural properties of a wound part but with the solid ID, which is not achievable using conventional winding processes. The term "substantially" is intended to mean considerable in extent or largely but not necessarily wholly that which is specified.

The two part wrapping mandrel 200 may be implemented instead of a single piece wrapping mandrel. Any suitable attachment mechanism may be implemented to attach the two wrapping mandrels 202 and 204 to the solid core 206. For example, the two wrapping mandrels 202 and 204 may be attached by a threaded interface, a mechanical interference, a friction fit, or still other attachment mechanisms. The two wrapping mandrels 202 and 204 may have a substantially cylindrical shape.

The resulting mandrel 210 may include an outer mandrel member 212 and the plug 206. The outer mandrel member 212 has an inner surface 214 that defines a channel that extends from a first end 216 to a second end 218.

The plug 206 is positioned within the channel between the first end 216 and the second end 218. The plug 206 contacts the inner surface 214 at a plug interface 220. In an aspect, the plug interface 220 is located in a center between the first end 216 and the second end 218. In alternative aspects, the plug interface 220 may be located at various locations within the channel between the first end 216 and the second end 218.

The inner surface 214 has a first inner diameter, a second inner diameter, and an interface diameter. The first inner diameter is a diameter of the channel between the first end 216 and the plug interface 220. The second inner diameter is a diameter of the channel between the plug interface 220 and the second end 218. In an aspect, the first inner diameter is substantially equal to the second inner diameter. The interface diameter is a diameter at the plug interface 220. The interface diameter is greater than the first inner diameter and the second inner diameter.

The plug 206 may have a biconic shape, rhombohedron shape, rectangular prism shape, or other suitable shape to substantially prevent fluid flow through the channel of the outer mandrel member 212.

The winding process may begin after the two wrapping mandrels 202 and 204 are attached to the plug 206. The two wrapping mandrels 202 and 204 may comprise steel, or other suitable material for winding. The two wrapping mandrels 202 and 204 may be coated with a coating material (not shown) to prevent resin and fibers of the composite material 208 from adhering during the winding process. The coating allows the two wrapping mandrels 202 and 204 to be removed after the winding process is complete. In alternative aspects, other methods may be used to prevent resin and fibers from adhering to the two wrapping mandrels 202 and 204, such as treating the surfaces of the wrapping mandrels 202 and 204, modifying the geometry of the wrapping mandrels 202 and 204 to facilitate removal, or still other methods. In still other alternative aspects, an outer surface of the plug 206 may be roughened and/or include a coating (e.g. adhesive) to prevent movement of the plug 206 within the channel of the outer mandrel member 212. The roughed surface and/or adhesive coating of the plug 206 provides a seal between the plug 206 and the resin and fiber layers wound around the plug 206, and may facilitate the removal of the wrapping mandrels 202 and 204 after the winding process is complete. During the winding process, the outer mandrel member 212 is formed by the resin and fibers, and the interface 220 is formed between the plug 206 and outer mandrel member 212 that provides a "fluid-tight" seal, substantially preventing any fluid from flowing through the channel of the of the outer mandrel member 212.

After winding the composite material 208 about the wrapping mandrel 200, a curing or postbake operation may be performed to enhance physical and structural characteristics of the composite material 208 to increase performance. The curing operation may be performed as appropriate depending on desired physical or structural characteristics. It will be appreciated that consideration may be made to ensure that the material properties of the plug 206 are not negatively affected by the temperature exposure during the curing process. Specifically, curing and/or postbaking may be conducted to avoid changing the material properties of the plug 206. In some embodiments, the materials of the plug 206 may be selected to withstand curing and/or postbaking.

After the curing or postbake operation is complete, any mechanical interface between the plug 206 and the two wrapping mandrels 202 and 204 may be broken and the two wrapping mandrels 202 and 204 may be removed. The resulting part is a structurally-sound composite tubular mandrel 210 with a solid ID formed by the plug 206 within the tubular outer mandrel member 212.

The mandrel 210 may be used in a bridge plug or other tool. Depending on the application, the bridge plug may have a variety of configurations and/or components including, for example, a seal, a lower slip, and an upper slip. The seal and the lower and upper slips are configured to selectively actuate into sealing engagement with an inner surface of the wellbore. The size and shape of the various components of the bridge plug may also be adjusted or selected according to the parameters of a given application.

These specific embodiments described above are for illustrative purposes and are not intended to limit the scope of the disclosure as otherwise described and claimed herein. Modification and variations from the described embodiments exist. The scope of the invention is defined by the appended claims.

What is claimed is:

1. A mandrel for substantially preventing fluid flow in a wellbore, the mandrel comprising:
   an outer mandrel member having an inner surface that defines a channel that extends from a first end of the outer mandrel member to a second end of the outer mandrel member; and
   a plug positioned within the channel between the first end and the second end, the plug contacting the inner surface of the outer mandrel member at a plug interface,
   wherein the inner surface has an inner diameter between the first end of the outer mandrel member and the plug interface,
   wherein the inner surface has an interface diameter at the plug interface, and
   wherein the interface diameter is greater than the inner diameter.

2. The mandrel of claim 1, wherein the outer mandrel member comprises a composite material.

3. The mandrel of claim 1, wherein the plug has a biconic shape.

4. The mandrel of claim 1, wherein the inner diameter is a first inner diameter, and wherein the inner surface has a second inner diameter between the second end of the outer mandrel member and the plug interface, and wherein the first inner diameter is substantially equal to the second inner diameter.

5. The mandrel of claim 1, wherein the plug is positioned in a center of the channel.

6. The mandrel of claim 1, wherein the plug comprises a non-metallic solid.

7. A bridge plug for substantially preventing fluid flow in a wellbore, the bridge plug comprising:
   a mandrel comprising:
      an outer mandrel member having an inner surface that defines a channel that extends from a first end of the outer mandrel member to a second end of the outer mandrel member, and
      a plug positioned within the channel between the first end and the second end, the plug contacting the inner surface of the outer mandrel member at a plug interface,
      wherein the plug is inlaid into the outer mandrel member,
      wherein the inner surface has an inner diameter between the first end of the outer mandrel member and the plug interface,
      wherein the inner surface has an interface diameter at the plug interface, and
      wherein the interface diameter is greater than the inner diameter;
   a seal member selectively actuatable into sealing engagement with an inner surface of the wellbore; and
   a plurality of slips actuatable into sealing engagement with the inner surface of the wellbore.

8. The mandrel of claim 1,
   wherein the inner diameter is a diameter of the channel between the first end of the outer mandrel member and the plug interface, and
   wherein the interface diameter is a diameter of the channel at the plug interface.

9. A method of forming a mandrel for substantially preventing fluid flow in a wellbore, the method comprising:
   coupling a first and a second wrapping mandrel to a plug to form a single wrapping mandrel;
   winding the single wrapping mandrel with a composite material to form an outer mandrel member, the plug contacting an inner surface of the outer mandrel member at a plug interface; and
   detaching the first and the second wrapping mandrels from the plug, wherein the plug remains in a channel formed by the outer mandrel member, wherein the inner surface has an inner diameter between a first end of the outer mandrel member and the plug interface, and wherein the inner surface has an interface diameter at the plug interface, wherein the interface diameter is greater than the inner diameter.

10. The method of claim 9, further comprising:
    applying a coating material onto each of the first and second mandrels.

11. The method of claim 9, further comprising:
    coupling a seal member to the mandrel, the seal member being selectively actuatable into sealing engagement with an inner surface of the wellbore; and
    coupling a plurality of slips to the mandrel, the plurality of slips being actuatable into sealing engagement with the inner surface of the wellbore.

12. The method of claim 9, wherein coupling the first and the second wrapping mandrels to the plug comprises at least one of threading, friction fitting, and mechanical interference.

13. The method of claim 9, wherein the inner diameter is a first inner diameter, and wherein the inner surface has a second inner diameter between a second end of the outer mandrel member and the plug interface, and wherein the first inner diameter is substantially equal to the second inner diameter.

14. The method of claim 9, wherein the plug is positioned in a center of the channel.

15. The method of claim 9, wherein the plug comprises a non-metallic solid.

* * * * *